D. F. COMSTOCK.
METHOD OF CONTROLLING AND APPARATUS FOR PRODUCING IONIC DISCHARGES.
APPLICATION FILED NOV. 14, 1916.

1,279,990.

Patented Sept. 24, 1918.
2 SHEETS—SHEET 1.

Inventor:
Daniel F. Comstock.
by Roberts Roberts & Cushman
his Attorneys.

D. F. COMSTOCK.
METHOD OF CONTROLLING AND APPARATUS FOR PRODUCING IONIC DISCHARGES.
APPLICATION FILED NOV. 14, 1916.

1,279,990.

Patented Sept. 24, 1918.
2 SHEETS—SHEET 2.

Inventor:
Daniel F. Comstock.
by Roberts Roberts Cushman
his Attorneys.

UNITED STATES PATENT OFFICE.

DANIEL F. COMSTOCK, OF BROOKLINE, MASSACHUSETTS, ASSIGNOR TO KALMUS, COMSTOCK & WESCOTT, INCORPORATED, OF BOSTON, MASSACHUSETTS, A CORPORATION OF MASSACHUSETTS.

METHOD OF CONTROLLING AND APPARATUS FOR PRODUCING IONIC DISCHARGES.

1,279,990.     Specification of Letters Patent.     Patented Sept. 24, 1918.

Application filed November 14, 1916. Serial No. 131,352.

*To all whom it may concern:*

Be it known that I, DANIEL F. COMSTOCK, a citizen of the United States, and a resident of Brookline, in the county of Norfolk and State of Massachusetts, have invented new and useful Improvements in Methods of Controlling and Apparatus for Producing Ionic Discharges, of which the following is a specification.

This invention relates to a method of and means for producing an ionic discharge, and particularly to the maintenance thereby of an intense source of light in a constant position. More particularly, the invention relates to a method and means whereby an arc carrying a heavy current may be used to produce, on one of a pair of electrodes, a steady incandescent area out of alinement with the other electrode and thus afford a source of intense illumination for projection apparatus and the like requiring a high degree of light concentration, and whereby the arc and incandescent area may be maintained in substantially constant position.

Arc lamps of the prior art, for instance focusing lamps intended for use with elements of an optical system in which an intense source of illumination maintained in a relatively constant position with respect to the optical surfaces is a necessity, have heretofore been rendered unsatisfactory, whenever the current value is increased beyond a critical figure, by several well-known phenomena. The positive or crater-bearing carbon presents at its surface the region of greatest luminosity of the entire source of light, the glowing carbon on this side of the arc gap having a higher specific emission than any other part of either the ionized stream constituting the arc proper or the remainder of the anode and cathode surfaces. When, as compared with the relative size of the carbon electrodes usually employed, current density increases, the flow of the arc between the anode and cathode carbons becomes more and more disturbed. It is a frequent ocurrence that the spot of greatest luminosity on the surface of the positive carbon wanders about the end of the carbon. The arc itself expands and flames, sometimes explosively. The vibration of the arc within the space between the electrodes sometimes comes violent, and singing, hissing and flaming arcs are familiar to those skilled in the art as consequences of increasing the current.

For the projection purposes forming one intended use of my invention an arc struck between electrodes situated with relation to one another at an angle differing considerably from a straight angle, for instance at a right angle, has the advantage of exposing the area of greatest luminosity to an optical axis arranged in the longitudinal axis of the positive carbon, thus permitting the positive carbon to be fed up as it is consumed without altering the position in space of the intensely illuminated area. The effect of flaming, vibration, blowing and wandering of the arc under a heavy current is, however, much increased by striking the arc between the electrodes at such an angle.

I have succeeded in overcoming the difficulties incident to the angular position of the electrodes, or to a relatively heavy current as for example of the order of 100 amperes, or to both the angular disposition of the electrodes and a heavy current, by the use of apparatus as hereinafter described in connection with certain species only of the genus of devices characterized by my invention. I attribute the successful operation of these devices to the application of certain principles which I shall now outline.

The outside potential applied to the carbon terminals of an arc causes an electric force to exist at all points of the gas throughout the region of the arc. In the gas there exist vast numbers of positive and negative ions, these being in general atoms or groups of atoms carrying positive or negative charges, and besides these, also negative electrons. Since the pressure of the gas is that of the atmosphere, no ion can travel very far without striking the surrounding molecules of the gas or other ions, the mean free path at ordinary temperature being of the order of magnitude of 1/200,000 cm. Consequently the ions, positive and negative, besides the rapid oscillatory heat motion which they share with all the molecules of the gas and which is necessitated by the heat energy and nearness of the other molecules, have impressed upon them a drifting motion in the general direction of the electric force at that point in space.

In general, this motion of drift, which in reality is the electric current itself, has a much smaller velocity than the random oscillatory velocity which corresponds to the intrinsic heat of the gas. What we call the current corresponds, therefore, to this relatively slow migration of positive ions in one direction and negative ions in the other direction. Many complicated effects occur other than those just mentioned, but the latter represent the broad lines of arc mechanism.

The effect of an electric field on ionized gas is therefore that the positive ions at every point of the gas move in the direction of the electric force at that point and the negative ions move in the opposite direction. The magnitude of the velocity, other things equal, is proportional to the strength of the electric field. Since ions are present in enormous numbers, and since positive ions attract all negative ions, it is impossible for the stream of negative ions to become appreciably separated from the stream of positive ions, that is, because of forces between oppositely charged ions their numbers in equal volumes of gas are always approximately equal, and therefore any force tending to deflect or change the path of either the positive or the negative stream has to act under the limitation that the other stream must also be deflected an approximately equal amount. This necessity for the practical coincidence of the two ionic streams makes the region of the gas which is carrying the discharge closely resemble a flexible conductor in its general mechanical behavior, the force acting on any part of the discharge being the resultant of the force acting on the positive and negative streams at that point.

If a magnetic field is set up, the lines of force of which are at right angles to the direction of the ionic flow at a point in the gas, it will, according to a well-known electro-magnetic law, act with a deflecting force on both streams of ions in the same direction, this direction being at right angles both to the direction of the field and to the direction of the ionic stream. In this respect, therefore, the action of the magnetic field is in marked contrast to the action of an electric field. In the case of an electric field, the positive and negative ions are forced in opposite directions, and the complex stream therefore experiences a resultant force equal to the difference of the two forces, which is of relatively small magnitude. In the magnetic case, however, the fact that the ions are oppositely charged and are moving with oppositely directed velocities causes the deflecting forces of the two ionic streams to act in the same direction, as above stated. The total stream therefore tends to move sidewise, and since the gas because of its fluid nature is always readily movable, there is a motion of the stream similar to that which a flexible conductor would exhibit.

The effect of a longitudinal magnetic field, that is a magnetic field the lines of force of which are along the lines of ionic flow, is a very much less marked effect than that produced by a transverse field of the same strength, but if the longitudinal field is increased in intensity sufficiently, it is found experimentally that it has a stabilizing and concentrating action on the ionic discharge, as will hereinafter be more fully described. If the magnetic field is along the line joining the centers of the electrodes but if the discharge is not accurately centered, that is, if the discharge by chance leaves one of the carbons a little to one side, then the path of discharge between the electrodes will in general take the form of a spiral. If the field is strong enough and if the arc is long enough, a complete rotation of this spiral may be easily observed. On the other hand, if the field is weak or if the arc is short, there may not be room for a complete revolution, and only the beginning of the spiral will be observed. The spiral form of discharge may also be produced, although less symmetrical in form, if the discharge is approximately central and the longitudinal field slightly tipped away from the axis of the discharge gap.

In the case of the right-angle arc, complicated phenomena are introduced because of the magnetic field which is created by the ionic flow and which is inseparable therefrom. This magnetic field of the ionic stream has no pronounced effect on the ordinary 180° arc because the lines of force of the field are in the form of circles about the axis of the stream and the deflecting forces due to it, therefore, cancel themselves out in all directions over the whole ionic stream. But in the case of the right-angle arc, or other arc playing between electrodes which are angularly disposed with respect to each other, the arc is bent outwardly by the action of its own magnetic field. This is due to the fact that its field is more intense within the angle defined by the electrodes than without this angle, as may be explained by considering that the portions of the circular lines of force surrounding the arc current which are within the angle defined by the electrodes are crowded together while the portions of the circular lines of force which are without this angle are spaced more widely apart. This expansive action of the magnetic field on the current itself in the case of the 90° arc makes it impossible to obtain a symmetrical crater when currents larger than about 35 amperes are used. When larger currents are applied the crater tends to form on the outer side of the end of the positive electrode, and in the end is unstable and generally unsatisfactory.

By the present invention I have devised a method of and means for overcoming this difficulty which involves the utilization of the two principles before enunciated, namely, the directive action on the arc of a transverse field and of a much stronger longitudinal field. When both of these fields act together the resultant field is approximately longitudinal of the discharge path because the strictly longitudinal component is much stronger than the transverse. Such a composite approximately longitudinal field overcomes the expansive tendency of the right-angle arc, stabilizes it, and also centralizes it; and I have found that by suitably controlling the magnetic field a stable, symmetrical crater can be produced, and that the crater can be maintained accurately at right angles to the axis of the positive carbon, when employing an arc discharge of as high as 120 amperes.

The principal objects of the invention are: the entrainment by an optical system of a high percentage of the light emitted by the arc owing to the fact that the incandescent area on the crater carbon can be positioned normally to the optical axis instead of obliquely thereto as in the case of the ordinary apparatus having the electrodes approximately parallel and approximately in alinement; the maintenance of the incandescent area in constant position on the end of the positive electrode by virtue of the directing and stabilizing effect of the impressed magnetic field; the maintenance of the incandescent area in alinement with the optical system by virtue of the fact that the positive electrode may be disposed along the optical axis of the system and may therefore be fed directly along the axis as the electrode is consumed, whereby small irregularities in the feeding velocity are not objectionable as in the case of the ordinary arc where the direction of feed is normal to or oblique to the optical axis and where irregularities in the feeding velocity therefore result in lateral variation in the position of the incandescent area with respect to the optical axis; and all of the above together with a possible increase of at least from 100 to 200 per cent. in the magnitude of controllable discharge current, and a corresponding increase in the total amount of light emitted by the arc, due to the stabilizing influence of the impressed magnetic field.

Other objects of the invention are to provide a method of control for electric arcs with respect to the prevention of flaming, blowing, vibration, wandering, hissing, singing, etc., as well as to provide suitable apparatus for conveniently and efficiently carrying out the improved method of control; and still further objects will be apparent from the following description read in the light of the accompanying drawings, in which—

Figures 1, 2:
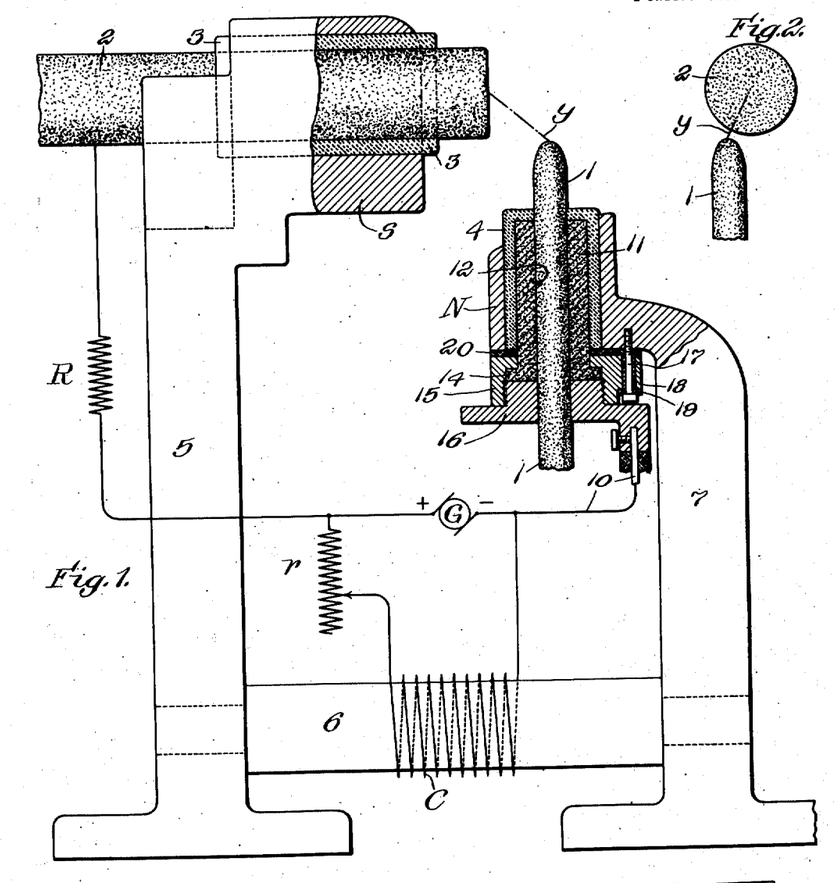
Figure 1 is a side elevation of the assembled apparatus showing parts in vertical longitudinal cross section.
Fig. 2 is a front elevation of the electrodes showing the lateral offset feature.
Figure 13:
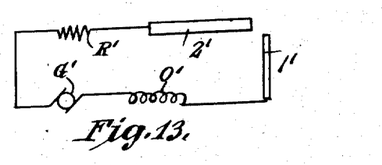
Fig. 13 is a diagram showing the field coil connected in series with the arc electrodes.

The preferred embodiment of the apparatus illustrated in Fig. 1, comprises a negative electrode 1, a positive electrode 2, the positive electrode being mounted longitudinally to reciprocate in the sleeve 3 of refractory material, and the negative electrode 1 being mounted longitudinally to reciprocate in the refractory sleeve 4 and conducting sleeve 11. The refractory sleeves 3 and 4 are fixedly mounted in the frame 5—6—7 formed of magnetic material such as cast iron. For a purpose hereinafter to be more fully set forth, the negative electrode is laterally offset to the left with respect to the positive electrode, as illustrated in Fig. 2. Electrical current is supplied to the positive and negative electrodes respectively through a suitable circuit including regulating resistance R from a source of electrical energy G; and the magnetic frame 5—6—7 is energized by means of a coil O surrounding the member 6 and being connected to the source of current through the adjustable resistance $r$. Instead of connecting the coil O in parallel with the arc electrodes it may be connected in series therewith, in which arrangement the intensity of the magnetic field produced by the coil O will vary in accordance with variations in the arc current. Thus in Fig. 13 I have shown the coil O' connected in series with the source G, resistance R', and electrodes 1' and 2'.

It has been found that better results can be obtained under certain circumstances with a negative electrode of very small diameter, but when operating upon currents of large magnitude, as for example 50 to 100 amperes, the negative electrode, if made quite small, becomes heated to a high temperature through its entire length when the current is supplied to it at its rearward end as is the ordinary practice. This not only rapidly disintegrates the electrode but the heat radiated therefrom seriously interferes with the operation of adjacent apparatus, especially when used in light projection apparatus. This difficulty may be overcome by supplying current to the electrode near its operative end thereby limiting the high temperature to the operative end which must, of necessity, be of high temperature. Suitable means for this purpose comprises a conducting sleeve 11 which is preferably composed of graphite and which is of such size as snugly to fit in the refractory sleeve 4 and to permit the electrode to be freely fed therethrough as it is consumed by the arc. Suitable means for holding the sleeve 11 in place and for supplying current to the sleeve, consists in an internally threaded flange 15 surrounding the flange 14 on the lower end of sleeve 11 and being secured to the frame piece 7 by means of a stud bolt 17 insulated from the flange 15 by means of a tube 18 of insulating material, the tube 18 having a flange 19 engaging the head of the bolt. In order completely to prevent electrical contact between the negative side of the circuit and the frame piece 7, a plate 20 of insulating material is preferably disposed between the flange 15 and the frame piece 7. Threaded into the flange 15 is a collar 16 having a recessed projection adapted to receive the end of the conductor 10. Thus, current is supplied to the negative electrode through collar 16 and the graphite sleeve 11 at points adjacent the operative end of the electrode and at points wholly inclosed by the graphite sleeve and the refractory casing 4. Owing to the fact that this portion of the electrode is wholly inclosed, no oxygen can be supplied to it from the surrounding air and, even though it becomes heated to a comparatively high temperature, rapid disintegration thereof is prevented.

The operation of the device is as follows: When current is supplied to the electrodes and is gradually increased in intensity, the arc flame between the opposed ends of the electrodes gradually moves outwardly and upwardly due to the fact that its own field increases in intensity in proportion to the increase of current and to the fact that its field is more intense within the angle defined by the electrodes than on the outside of the arc discharge. When the current reaches a magnitude of the order of 35 amperes, the outward tendency of the arc becomes excessive, resulting in blowing, hissing and sputtering of the arc, and if the current be sufficiently increased the arc may be entirely blown out by its own field. Even with moderate currents the outward tendency of the arc causes the crater to be formed on the upper side of the positive electrode and owing to the variation in the direction of the arc, this crater does not remain stationary but moves with more or less rapidity over the end of the positive carbon.

When the electrical circuit through coil O is closed, however, and the magnetic circuit 5—6—7 is energized, thereby producing a stream of magnetic flux across the gap between the pole pieces N and S approximately longitudinally of the line $y$ connecting the axes of the opposed electrodes, the tendency of the arc to expand is overcome and the ionic stream is caused to flow quietly and steadily from the tip of the negative electrode to the end of the positive electrode. By suitably adjusting the intensity of the magnetic field, the incandescent area on the end of the positive electrode may be caused to remain entirely steady and constant in position even with currents of the order of 100 amperes. By laterally offsetting one of the electrodes with respect to the other electrode as indicated in Fig. 2, the incandescent area may be maintained perpendicular to the axis of the positive electrode indefinitely. It has been found that better results can be obtained by so winding the coil O that the pole piece N is of north polarity and the pole piece S is of south polarity, and this is especially true when the negative electrode is offset to the left as represented.

Figures 4, 5, 6, 7, 8, 9, 10, 11, 12:
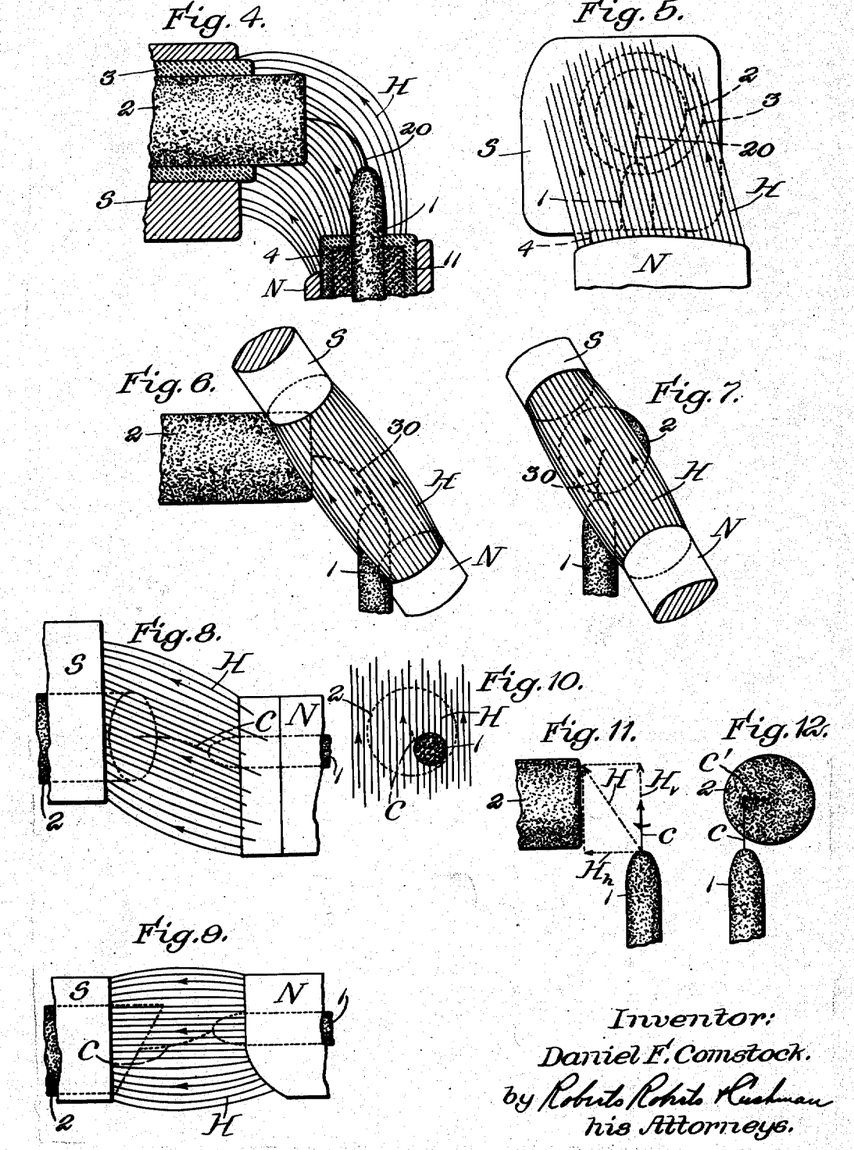
Fig. 4 is a vertical longitudinal section of a portion of a modified form of apparatus in which the magnetic pole pieces are asymmetrically disposed with respect to the electrodes.
Fig. 5 is a front elevation of the detail shown in Fig. 4.
Fig. 6 is a detail view illustrating another modification of the invention in which the pole pieces do not surround the electrodes.
Fig. 7 is a front elevation of the detail illustrated in Fig. 6.
Fig. 8 is a side detail view of a modified form of apparatus in which the electrodes are parallel but out of alinement.
Fig. 9 is a plan view of the detail shown in Fig. 8.
Fig. 10 is an end view of the detail shown in Fig. 8 with the pole pieces omitted.
Figs. 11 and 12 are diagrams illustrating the theory of operation of the apparatus.

It has been observed that the ionic stream in apparatus of the character described follows a spiral path and this I believe to be due to the phenomena illustrated in Figs. 11 and 12 in which H represents the approximate direction of the impressed magnetic field, $H_v$ the vertical component of the impressed field, $H_h$ the horizontal component of the impressed field, and C the approximate direction in which the negative ions and electrons start from the negative electrode. The reason that the negative stream of ions and electrons moves directly outwardly from the negative electrode instead of moving toward the nearest portion of the positive electrode, I believe to be due to the fact that the field produced by the arc current is more intense within the angle defined by the electrodes than without this angle, as above stated. By virtue of the greater intensity of the field within the angle, the ionic stream is forced outwardly and under proper operating conditions, is directed upwardly as indicated by C. Inasmuch as this current is directed along the vertical component $H_v$ of the magnetic field, it is only acted upon by the horizontal component $H_h$ and the action of the horizontal component $H_h$ is to cause the ionic stream to bend to the right (in Fig. 12). This action may be explained in the well-known manner by saying that the lines of force surrounding the ionic stream C are in the direction indicated by the small arrow in Fig. 11, and that this field augments the horizontal component $H_h$ on the left side of the stream (Fig. 12) while counteracting the horizontal component on the right side of the stream, thereby causing the stream to move from the region of the strong field to the region of the weaker field, that is, to the right in Fig. 12. In like manner, the movement of the ionic stream from left to right causes it to be forced toward the positive electrode, as may be explained by the fact that the field produced by the lateral component of movement C' produces a field as indicated by the small arrow in Fig. 12 which augments the impressed magnetic field upon its upper outer side and diminishes the force of the field on its lower inner side. While the path of the ionic discharge has been traced in only two steps, it is obvious that both the vertical and lateral movements continue simultaneously and continuously throughout the entire path of the discharge between the electrodes, thereby resulting in the spiral movement heretofore referred to.

If the electrodes are spaced sufficiently far apart and the ionic stream and impressed magnetic field are properly adjusted, the stream may make one or more complete spirals, although in the particular embodiment of the apparatus herein disclosed the electrodes are sufficiently close together and the impressed magnetic field is sufficiently weak to cause the discharge to describe only a portion of a complete spiral revolution. By spacing the electrodes farther apart and by properly adjusting the current and field, it is probable that the lateral offset of one electrode with respect to the other electrode may be rendered unnecessary owing to the fact that the discharge may make approximately a complete spiral revolution under such conditions.

Figure 3:
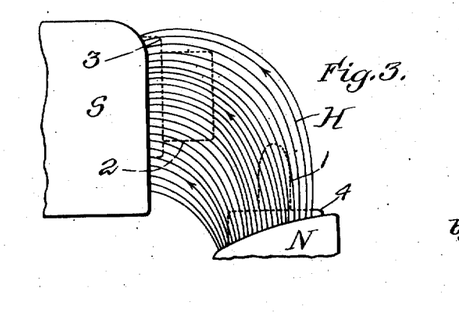
Fig. 3 is a detail view showing the disposition of the lines of magnetic flux with respect to the ends of the electrodes.

The diagram in Fig. 3 which is an accurate reproduction of an iron-filing photograph taken with a field of normal magnitude impressed on the region of the arc gap, illustrates the fact that the field in the region of the arc gap is angularly shifted about an axis perpendicular to or approximately perpendicular to a plane parallel to the two electrodes.

In this particular embodiment of the invention it appears that the lines of force passing through the end of the negative electrode do not intersect the end of the positive electrode centrally but that they intersect the end of the electrode somewhat above the center thereof, the lines of force which intersect the central portion of the positive electrode passing on the inside of the end of the negative electrode. While this condition is not thought to be essential, it has been found that under certain circumstances it improves the operation of the apparatus.

From the above discussion it is obvious that the spiral movement of the arc discharges will cause the discharge to strike the positive electrode at a spot which is laterally offset from the emission area of the negative electrode except in the case where the discharge makes just that fraction of one or more complete spiral revolutions in transit across the gap which will bring the discharge back into the plane of the negative electrode, this being due to the fact that the discharge necessarily moves laterally with respect to the plane of the impressed magnetic field. However, by angularly shifting the impressed magnetic field about an axis in a plane parallel to the electrodes, the magnetic field may be rendered laterally oblique to the axis of the gap between the electrodes even where the electrodes are in exact alinement, and the tendency of the discharge while transversely of the magnetic field, may still not be appreciably transversely of the electrodes, whereby the electrodes may be positioned approximately or even exactly in the same plane and yet produce an incandescent area on the end of the positive electrode which is substantially perpendicular to the axis of the electrode.

One suitable means of angularly shifting the magnetic field is illustrated in Figs. 4 and 5 wherein the magnetic poles are made asymmetric by providing greater mass on the left side of the south pole S and a greater mass on the right side of the north pole N. With this arrangement the spiral path 20 of the arc discharge may be directed somewhat transversely of the impressed magnetic field H and still be centered upon the end of the positive electrode, thus producing a uniform consumption of the positive electrode throughout its end and therefore affording a constant disposition of the crater in normal or perpendicular relationship to the axis of the positive electrode.

Another means for producing a magnetic field laterally oblique to the axis of the arc gap, which is somewhat similar to that disclosed in Figs. 4 and 5, is that shown in Figs. 6 and 7. In this embodiment of the invention the magnetic pole pieces N and S do not surround the electrodes 1 and 2 as in the preceding figures, but they are disposed in approximate alinement with the axis of the arc gap so as to produce a stream of magnetic flux comprising substantially straight parallel lines of force in the region of the arc discharge. While this stream of flux is approximately longitudinal of the arc gap, it is angularly shifted with respect to the arc gap both in the plane of the electrodes as indicated in Fig. 6, and in a plane perpendicular to the plane of the electrodes, as indicated in Fig. 7. With this arrangement, as in Figs. 4 and 6, the electrodes need be laterally displaced with respect to each other only slightly, if at all, in order to produce the incandescent area squarely on the end of the positive electrode in perpendicular relationship to the axis of the electrode.

In Figs. 8, 9 and 10 I have disclosed another arrangement embodying the principles of this invention wherein the electrodes may be disposed in parallelism and yet produce an incandescent area on the end of the positive electrode which is out of alinement with the negative electrode and which can consequently be disposed in normal relationship to the axis of an optical system. This result is accomplished by offsetting the negative electrode both laterally and vertically as shown in Fig. 10, and by employing magnetic pole pieces N and S which are asymmetrically arranged, the pole piece N having increased mass on its lower side, as shown in the side elevation of Fig. 8, and also on its left side, as shown in the plan view of Fig. 9, while the pole piece S has increased mass on its upper side as shown in Fig. 8, and on its right side as shown in Fig. 9. With this or a similar arrangement of the electrodes and pole pieces, the magnetic field can be so directed across the arc gap that the arc discharge $C_1$ traveling in a spiral path will produce an incandescent area which is oblique to the axis of the positive electrode as indicated. It will be observed that the same principles are involved in this arrangement as in the former arrangements, namely, the magnetic field is directed approximately longitudinally of the axis of the arc gap but is angularly shifted somewhat with respect to this axis. While this arrangement may not be as satisfactory as the angular arrangement of the electrodes for some purposes, there are certain advantages in having the electrodes mounted in parallelism as in the ordinary arc apparatus.

Inasmuch as the field produced by the arc current increases with increase in the current, the lateral force tending to move the arc discharge outwardly and upwardly increases with increase of current. In order to overcome this tendency the impressed magnetic field may be increased in proportion to the increase in current by connecting the magnetic field coil in series with the arc circuit, as above explained, whereby the incandescent area may be maintained in constant position notwithstanding variations in the magnitude of the discharge current.

The herein disclosed means for supplying current to the negative electrode adjacent its operative end whereby the electrode may be made of relatively small cross-sectional area is of importance inasmuch as the ionic discharge playing between the angularly disposed electrodes can be more effectively directed and controlled by means of the longitudinal magnetic field than when the operative end of the negative electrode is of larger size.

In the appended claims the word "unidirectional" is employed in contradistinction to an alternating or rapidly reversing current or field, and the expression "suitable potential gradient along the gap" signifies a rate of voltage drop between the opposing ends of the arc electrodes which is suitable to produce an ionic discharge of the desired magnitude. The word "asymmetrical" is used in contradistinction to the word "symmetrical" and as used with reference to the relative disposition of the electrodes is intended to apply to any arrangement where the electrodes are out of alinement, as illustrated for example in the drawings wherein the electrodes are rendered asymmetrical either by being angularly arranged with respect to each other, or laterally shifted with respect to each other, or both angularly arranged and laterally shifted relatively to each other.

I claim:

1. The method of producing an arc discharge in a gap between opposed electrodes comprising producing a suitable potential gradient along the gap, creating a magnetic field in the region of the gap, and regulating the magnetic field relatively to the arc discharge so as to produce a steady incandescent area on one of the electrodes out of alinement with the other electrode.

2. The method of producing an arc discharge in a gap between opposed electrodes comprising producing a suitable potential gradient along the gap, creating in the region of the gap an unidirectional magnetic field the lines of flux of which are directed approximately in the direction of the discharge on every side of the discharge, and regulating the magnetic field relatively to the arc discharge so as to produce a steady incandescent area on one of the electrodes out of alinement with the other electrode.

3. The method of producing an arc discharge in a gap between opposed electrodes comprising producing a suitable potential gradient along the gap, creating in the region of the gap an unidirectional magnetic field the lines of flux of which are approximately parallel throughout the region of the gap and are approximately longitudinal of the gap, and regulating the magnetic field relatively to the arc discharge so as to produce a steady incandescent area on one of the electrodes out of alinement with the other electrode.

4. The method of producing an ionic discharge in a gap between opposed electrodes comprising producing a suitable potential gradient along the gap creating in the region of the gap a concentrated magnetic field having its lines of flux disposed longitudinally of the gap but angularly shifted somewhat with respect to the axis of the gap, and regulating the magnetic field relatively to the gap to direct the ionic discharge along an unchanging path between the electrodes.

5. The method of producing an ionic discharge in a gap between asymmetrically disposed electrodes of positive and negative polarity, respectively, comprising creating a suitable potential gradient along the gap, and creating approximately along the gap a magnetic field of flux of such intensity as to maintain a steady incandescent area on the end of the positive electrode in substantially normal relationship to the axis of the electrode.

6. The method of producing an ionic discharge in a gap between opposed electrodes of positive and negative polarity, respectively, comprising creating a suitable potential gradient along the gap, and creating in the region of the gap a stream of magnetic flux angularly shifted with relation to the axis of the gap a small amount so that the discharge is directed in a substantially unchanging spiral path to the end of the positive electrode, thereby maintaining on the positive electrode out of alinement with the negative electrode an incandescent area which is steady and constant in position with currents up to the order of 100 amperes.

7. The method of producing an ionic discharge in a gap between opposed electrodes comprising creating a suitable potential gradient along the gap, creating in the region of the gap a stream of magnetic flux angularly shifted with respect to the axis of the gap a small amount, and regulating the stream of magnetic flux so that the discharge is distributed over the end of one electrode in such manner that a steady incandescent area is maintained on the end of the electrode out of alinement with the other electrode.

8. The method of producing an ionic discharge in a gap between asymmetrically disposed electrodes of positive and negative polarity, respectively, comprising creating a suitable potential gradient along the gap, and creating in the region of the gap a magnetic field having components respectively transverse and longitudinal of the gap, so that the transverse component directs the discharge to the end of the positive electrode and the longitudinal component stabilizes the discharge, whereby a steady incandescent area is formed on the end of the positive electrode out of alinement with the negative electrode.

9. The method of producing an ionic discharge in a gap between asymmetrically disposed electrodes of positive and negative polarity, respectively, comprising creating a suitable potential gradient along the gap, and creating in the region of the gap a magnetic field having components respectively transverse and longitudinal of the gap, so that the transverse component directs the discharge to the end of the positive electrode and the longitudinal component stabilizes the discharge, whereby a steady incandescent area is formed on the end of the positive electrode out of alinement with the negative electrode and in substantially normal relationship to the axis of the positive electrode.

10. The method of maintaining in constant position on an anode a steady incandescent area which is asymmetrically positioned with respect to the opposing cathode comprising producing an ionic discharge across the gap between the electrodes, and creating a stream of magnetic flux across the gap in such manner that the lines of flux passing through the portion of the incandescent area farthest removed from the cathode pass through the central portion of the emission area of the cathode and that the lines of force passing through the portion of the incandescent area nearest to the cathode pass laterally of the central portion of the emission area of the cathode, whereby the ionic discharge is so distributed over the incandescent area that the anode is uniformly consumed and the asymmetry of the incandescent area is maintained constant.

11. Light projection apparatus comprising opposed electrodes having a gap therebetween, the electrodes being asymmetrically arranged so that a continuation of the axis of one electrode does not intersect the other electrode, and a magnetic circuit having a gap so disposed longitudinally of the electrode gap that a steady incandescent area is maintained on said one electrode out of alinement with said other electrode.

12. Light projection apparatus comprising positive and negative electrodes having a gap therebetween, the electrodes being asymmetrically arranged so that a continuation of the axis of the positive electrode does not intersect the negative electrode, and a magnetic circuit having a gap so disposed longitudinally of the electrode gap that a steady incandescent area is maintained on the positive electrode out of alinement with the negative electrode.

13. Light projection apparatus comprising asymmetrically arranged electrodes, means for producing an ionic discharge between the electrodes, and means for producing approximately along the discharge a magnetic field the strength of which is so related to the distance between and the asymmetry of the electrodes that a steady incandescent area may be maintained on the end of one electrode out of alinement with the other electrode.

14. Light projection apparatus comprising electrodes asymmetrically arranged with a gap therebetween, means for producing a unidirectional ionic discharge across the said gap, and opposed pole pieces for producing in the region of the said gap a concentrated magnetic field having lines of force directed approximately along the axis of the gap and having a strength proportional to the distance between and the asymmetry of the electrodes so that a steady incandescent area is formed on one of the electrodes out of alinement with the other electrode.

15. Light projection apparatus comprising opposed positive and negative electrodes arranged at an angle of approximately 90° with respect to each other with the end of the positive electrode out of alinement with the negative electrode, means for producing an arc discharge between the opposed ends of the electrodes, and means including opposed magnetic pole pieces for maintaining a magnetic field longitudinally of said discharge, the opposed ends of the pole pieces being disposed in proximity to the opposed ends of the electrodes respectively.

16. Light projection apparatus comprising opposed electrodes angularly disposed with relation to each other, means for producing an ionic discharge therebetween, and means for producing in approximately parallel relation with a line joining the axes of said electrodes a magnetic field of such intensity as to produce a steady incandescent area on one of said electrodes out of alinement with said other electrode.

17. Light projection apparatus comprising opposed electrodes angularly disposed with relation to each other, means for producing an ionic discharge therebetween, and means comprising opposed magnetic pole pieces for producing in approximate parallelism with a line joining the axes of said electrodes a magnetic field of such intensity as to cause the discharge to produce a steady incandescent area on the end of one of said electrodes in substantially normal relationship to the axis of the electrode.

18. Light projection apparatus comprising opposed electrodes angularly disposed with relation to each other, means for producing an ionic discharge therebetween, and means comprising opposed magnetic pole pieces surrounding said electrodes respectively for producing along the gap between said electrodes a magnetic field of such intensity as to cause the discharge to produce a steady incandescent area on one of said electrodes out of alinement with the other electrode.

19. Light projection apparatus comprising opposed electrodes angularly arranged with respect to each other so as to have an arcuate gap between the ends thereof, and means including opposed pole pieces for producing a concentrated stream of magnetic flux along said arcuate gap, the opposed pole pieces having their magnetic axes so arranged substantially lengthwise of said arcuate gap as to direct said discharge to an unchanging area on the end of one of the electrodes out of alinement with the other electrode.

20. Light projection apparatus comprising opposed electrodes angularly arranged with respect to each other so as to have an arcuate gap between the ends thereof, the angle between the electrodes being not greater than approximately 135°, means for producing an arc discharge between the opposed ends of said electrodes, and means including opposed pole pieces for producing a concentrated stream of magnetic flux along said arcuate gap, the opposed pole pieces having their magnetic axes so arranged substantially lengthwise of said arcuate gap as to direct said discharge to an unchanging area on the end of one of the electrodes out of alinement with the other electrode.

21. Light projection apparatus comprising opposed electrodes angularly disposed with relation to each other, means for producing an arc discharge therebetween, means for creating approximately longitudinally of the path of discharge a magnetic field so related to the discharge as to direct said discharge to an unchanging area on the end of one electrode out of alinement with the other electrode, and means for varying the intensity of said field in accordance with variations in the flow of current between the electrodes so that said area is unchanging notwithstanding spontaneous variations in said discharge current.

22. Electrical apparatus comprising electrodes having opposing ends spaced apart, means for producing an ionic discharge across the gap between the opposed ends of the electrodes, and means for producing in the region of the said gap a concentrated magnetic field having lines of force directed predominantly along the axis of the gap but angularly shifted somewhat with respect to the said axis so that a steady incandescent area is formed on one of the electrodes out of alinement with the other electrode.

23. Electrical apparatus comprising electrodes having opposing ends spaced apart and being asymmetrically arranged with respect to each other, means for producing an ionic discharge along the gap between the opposed ends of the electrodes, and means for producing in the region of the said gap a concentrated magnetic field having lines of force directed predominantly along the axis of the gap but angularly shifted somewhat with respect to the said axis so that a steady incandescent area is formed on the end of one of the electrodes in substantially normal relationship to the axis of the electrodes.

24. Electrical apparatus comprising a negative electrode and a positive electrode arranged with a gap between the ends thereof, the positive electrode having an incandescent area oblique to a line connecting the centers of the opposing ends of the electrodes, means for producing an ionic discharge from the negative to the positive electrode, and means for creating a concentrated stream of approximately parallel magnetic lines of flux along said gap but orientated relatively to said connecting line so that the lines of force passing through the center of the end of the negative electrode are displaced from the center of the other end, whereby the ionic discharge is distributed over the incandescent area in such manner that the consumption of the anode is substantially uniform throughout the incandescent area and the said obliquity of the incandescent area is maintained constant.

25. Electrical apparatus comprising a positive electrode and a negative electrode arranged with a gap between the ends thereof, the positive electrode having an incandescent area oblique to a line connecting the centers of the opposing ends of the electrodes, means for producing an ionic discharge between the electrodes, and means for creating a concentrated stream of magnetic flux approximately in the direction of electronic flow but angularly shifted relatively to said connecting line so that the lines of flux make more acute angles with the incandescent area than said connecting line, whereby the ionic discharge is distributed over the incandescent area in such manner that the consumption of the anode is substantially uniform throughout the incandescent area and the said obliquity of the incandescent area is maintained constant.

26. Electrical apparatus comprising a positive electrode and a negative electrode arranged with a gap between the ends thereof, the positive electrode having an incandescent area oblique to a line connecting the centers of the opposing ends of the electrodes, means for producing an ionic discharge between the electrodes, and means for creating a concentrated stream of magnetic lines of flux along said gap but angularly shifted relatively to said connecting line about an axis intersecting a plane parallel with both electrodes so that the lines of flux make more acute angles with the incandescent area, whereby the ionic discharge is distributed over the incandescent area in such manner that the consumption of the anode is substantially uniform throughout the area and the said obliquity of the area is maintained constant.

27. Electrical apparatus comprising angularly disposed negative and positive electrodes having opposing ends spaced apart, means for producing an ionic discharge along the gap between the opposing ends of the electrodes, and means for creating a concentrated stream of approximately parallel magnetic lines of flux along said gap so that the discharge is substantially uniformly distributed over the end of the positive electrode, and a steady incandescent area is maintained in constant position on the end of the positive electrode in substantially normal relationship to the axis of the electrode.

28. Electrical apparatus comprising asymmetrically arranged negative and positive electrodes having opposing ends spaced apart, means for producing an ionic discharge along the gap between the opposing ends of the electrodes, and means for creating in the region of said gap a magnetic field the lines of force of which are approximately parallel but are angularly shifted somewhat with relation to the axis of said gap so that the discharge is substantially uniformly distributed over the end of the positive electrode and a steady incandescent area is maintained in constant position on the end of the positive electrode out of alinement with the negative electrode.

29. Electrical apparatus comprising electrodes having opposing ends spaced apart, the electrodes being arranged obliquely with respect to each other, means for producing an ionic discharge across the gap between the opposing ends of the electrodes, and means for producing throughout the gap a stream of magnetic flux the lines of which are approximately parallel and are angularly shifted in a plane parallel to both electrodes so that a steady incandescent area is maintained in constant position on the end of the positive electrode.

30. Electrical apparatus comprising electrodes disposed in spaced parallel planes, means for producing an ionic discharge between opposing ends of the electrodes, and means for producing a stream of magnetic flux longitudinally of the line connecting the centers of said opposing ends but angularly shifted with respect to said line about an axis intersecting said planes at angles of approximately 90° so that a steady in- 31. Electrical apparatus comprising electrodes disposed in spaced parallel planes with a gap between the opposing ends thereof, means for producing an ionic discharge across said gap, and means for producing a stream of magnetic flux approximately along the line connecting the centers of said opposing ends, the stream of flux being angularly shifted about an axis intersecting said planes so that a steady incandescent area is maintained in constant position on the end of the positive electrode in substantially normal relationship to the axis of the electrode.

32. Electrical apparatus comprising electrodes disposed in spaced parallel planes with a gap between the opposing ends thereof, means for producing an electrical discharge across said gap, and means for producing a stream of magnetic flux along the line connecting the centers of said opposing ends, the stream of flux being angularly shifted both in parallelism with and transversely to said planes so that a steady incandescent area is maintained in constant position on the end of the positive electrode, out of alinement with the negative electrode, and in substantially normal relationship to the axis of the positive electrode.

33. Light projection apparatus comprising opposed electrodes arranged to have an arc discharge produced therebetween, and pole pieces disposed around said electrodes respectively, one of said pole pieces being eccentric to the corresponding electrode.

34. Light projection apparatus comprising opposed arc electrodes disposed out of alinement, and pole pieces disposed around said electrodes respectively, one of said electrodes being eccentric to the corresponding electrode.

35. Light projection apparatus comprising opposed electrodes arranged at an angle to each other, and pole pieces disposed around said electrodes respectively, one of said pole pieces extending farther from the corresponding electrode on the inside of said angle than on the outside thereof.

Signed by me at Boston, Massachusetts, this thirty-first day of October, 1916.

DANIEL F. COMSTOCK.